United States Patent [19]

Bennett

[11] 4,184,338
[45] Jan. 22, 1980

[54] HEAT ENERGIZED VAPOR ADSORBENT PUMP

[75] Inventor: Charles E. Bennett, Scottsdale, Ariz.

[73] Assignee: Motorola, Inc., Schaumburg, Ill.

[21] Appl. No.: 952,186

[22] Filed: Oct. 16, 1978

Related U.S. Application Data

[62] Division of Ser. No. 789,482, Apr. 21, 1977.

[51] Int. Cl.$^2$ .............................................. F25B 27/00
[52] U.S. Cl. ............................................................. 62/2
[58] Field of Search ...................... 62/2, 112, 79, 480, 62/476; 417/207

[56] References Cited

U.S. PATENT DOCUMENTS

| | | | |
|---|---|---|---|
| 2,138,686 | 11/1938 | Altenkirch | 62/2 |
| 4,034,569 | 7/1977 | Tchernev | 62/2 |
| 4,081,024 | 3/1978 | Rush et al. | 62/2 |
| 4,100,756 | 7/1978 | Albertson | 62/2 |
| 4,121,428 | 10/1978 | Glenn et al. | 62/2 |

*Primary Examiner*—Lloyd L. King
*Attorney, Agent, or Firm*—M. David Shapiro; Eugene A. Parsons

[57] ABSTRACT

A solid matrix of microporous adsorbent is utilized to provide a barrier between two bodies of a gaseous mixture of which at least one constituent is a sorbable vapor. Appropriate application of heat at the opposing interfaces of the adsorbent barrier produces a partial pressure differential across the barrier. The adsorbent material is energized from a convenient heat source; for example, solar energy. The vapor pump of the invention may be used for environmental refrigeration and may be of the open or closed type. Other uses for the vapor pump are for producing a supply of pure water from low vapor content air or for drying air by removing the vapor content.

8 Claims, 13 Drawing Figures

HEAT ENERGIZED VAPOR ADSORBENT PUMP

This is a division of application Ser. No. 789,482, filed on Apr. 21, 1977.

FIELD OF THE INVENTION

The invention relates to a heat energy operated vapor pump and its use in cooling systems of open or closed loop types and in water reclamation systems. The pump is especially adaptable for utilizing the heat energy from a solar source for its operating energy source.

BACKGROUND OF THE INVENTION

There has long been a need for control of the living environment in terms of temperature and humidity. The need extends to requirements for control of the environments in which man lives and works (his shelter), and to sub-environments which house and preserve perishables. Some commercial applications of such systems include the manufacture of ice, environmental control of public and office buildings, hotels, stores and factories.

Two basic types of refrigeration systems exist in the prior art; intermittant and continuously operating systems. The continuously operating system is prevalent in modern use. Within the constraint of continuously operating refrigeration systems, there are two major sub-types. Absorbent systems (see FIG. 3) such as the Platers-Munters type (marketed by Servel, Inc.) and vapor compression systems (see FIG. 1) which widely prevail in the United States. These two sub-types share some common features. Each is provided with condenser heat exchanger 10 for converting relatively high temperature, high pressure gas to a warm liquid state, each utilizes expansion valve 14 for controlled expansion of the warm liquid to a cooler gas state and each provides evaporator heat exchanger 2 for extracting heat from a volume which is to be environmentally controlled. Heat pump versions of at least the compressor type systems are supplied with reverse cycle capability for heating the volume to be environmental controlled. Both systems depend upon the relatively high efficiencies available when refrigerant is converted from a gas to a liquid state and from a liquid to a gas state based on the "leverage" provided by high latent heats of vaporization and condensation.

The major features of the two systems may be distinguished by inspection of FIGS. 1 and 3. Either system requires an energy input; compressor 6 requiring rotary motion, generally suppled by electric motor 5, and the absorbtion system requiring relatively high temperature source of heat 30 for desorption (FIG. 3).

The absorption system as commercialized by Servel, Inc. (FIG. 4) utilizes an absorbent, which may be water, a refrigerant, which may be ammonia, and a pressure equalizing gas, which may be hydrogen. While the partial pressure of the refrigerant varies from the high pressure side of the system to the low pressure side of the system, the introduction of hydrogen gas provides compensation providing for equalization of the total pressures on each side of the system thereby eliminating the need for a fluid pump and for a second throttling valve. The Servel, Inc., version of the absorption refrigeration system thereby avoids the use of any mechanical moving parts at all and allows for gravity and convection flow of the various liquids and vapors in the closed system.

Referring to FIG. 4, generator 200 contains a saturated solution of ammonia absorbed in water. Heat source 202 supplies the energy required to drive ammonia gas (represented by small circles) out of the ammonia/water mixture 204. Ammonia gas is released and rises in conduit 206 to separator 208. Water is carried along by a percolation process and the mixture is separated in separator 208. The relatively ammonia-free water leaves separator 208 in conduit 210 while the liberated hot ammonia gas rises in conduit 212 to condenser 10. The gas is reduced in temperature by condenser 10 and is converted to a warm liquid at liquid trap 214. When the warm ammonia liquid passes through liquid trap 214, it sees a reduced partial ammonia vapor pressure in conduit 216 and evaporator 2. It is then able to expand at the lower pressure, becoming a relatively cold gas in evaporator 2. Heat from volume 18 is absorbed by the cold gas in evaporator 2, thereby cooling volume 18. Conduit 218 carries the warmed ammonia gas to absorbers 220 and 222.

The low ammonia content water from separator 208 is cooled in absorbers 222 and readily absorbs the warm ammonia gas from conduit 218. The ammonia-bearing water flows by gravity feed to absorber 220 and then through conduit 224 back to generator 200, there to begin the cycle over again.

Conduit 226 is filled with an inert or neutral gas such as hydrogen. The hydrogen also infiltrates the low pressure side of the system; that is, conduits 216, 218, and 222, upper portion of absorber 220 and absorbers 222. The partial pressure of hydrogen plus the partial gas pressures are additive to the total system pressure so that the total system pressure is equal in all portions of the system.

Systems utilizing dessicant beds have been described in the prior art. Some are of the type which require physical transportation of the bed, such as that described in "Solar Energy Thermal Processes", John Wiley and Sons, Duffie and Beckman, pages 341–3, and others attain intermittant operation only. Faraday demonstrated an intermittant absorber-vaporizer utilizing silver chloride and ammonia in 1824. See FIG. 2. Absorber 33 (silver chloride), which had been exposed to dry ammonia gas in one end 34 of inverted "V" test tube 36, was heated. When opposite end 38 of "V" shaped test tube 34 was cooled by insertion in water 40, liquid ammonia 42 was condensed at the cooled end. When the heat was removed from the absorber end of the test tube, Faraday noticed that the liquid ammonia in the other end boiled violently, changing back to a vapor which was reabsorbed by the silver chloride absorber. The latent heat of vaporization caused the liquid ammonia end of the test tube to be very cold.

Intermittant absorbtion systems were popular in the 1930's. The Trukhold refrigerator distributed by Montgomery Ward and the Icy Ball system manufactured by the Crosley Corporation were examples of this type. ("Modern Refrigeration and Air Conditioning", Althouse and Turnquist, The Goodheart-Willcox Co., Inc., 1960.)

The ammonia/water/hydrogen combination employed in the Servel system is typical of absorption systems (as contrasted to adsorption systems). There, water is used as an absorbent and absorption is of a chemical nature. In contrast, other systems utilize physical adsorbents, one of the most common being silica gel. Silica gel is a microporous inert material. It is characteristic of the material that each granual is literally full of interconnected molecular sized holes which provide an enormous amount of internal surface area. It is also characteristic of silica gel that transient adsorption rates are very rapid and the high rates of diffusive flow are attributed to strong surface diffusion phenomena. When sorbable vapors are adsorbed into high internal surface area microporous media, the diffusive flux is greatly increased by surface diffusion of mobile adsorbed films in a concentration gradient.

Another material which exhibits similar characteristics is Vycor porous glass as manufactured by the Corning Glass Works, Corning, N.Y.

E. R. Gilliland, R. F. Baddaur and H. H. Engel reported the results of an investigation of gas flow by adsorption in "Flow of Gases Through Porous Solids Under the Influence of Temperature Gradients", American Institute of Chemical Engineers Journal, 8 A.I.Ch.E.J. 530, September, 1962. Results recorded there indicate a diffusion gas flow from a cold to a hot surface through a porous solid such as Vycor. K. G. Denbigh and G. Rauman have suggested that such a flow through a thin rubber membrane may occur in the face of adverse pressure differentials, although, as well known in the art, the diffusion rate is as much as 1,000 times slower than the diffusion through Vycor porous glass. 210A Proceedings of the Royal Society (London) 518 (1951). Gilliland et al, supra, at 530, stated, "both the gas phase and surface flows are from the cold end to the hot end of the porous solid." They suggested, in conclusion, supra, at page 535, "Isobaric permeabilities of the pure adsorbed gases investigated are considerably higher than the values predicted from correlation based on free-molecular flow data. The higher rates of flow are attributed to a net migration of adsorbed gas along the surface of the pores." This high flow rate migration phenomona is not noticable in non-hygroscopic materials.

The phenomona reported by Gilliland et al, supra, may be better understood by means of the following: Since the adsorption process is exothermic upon occurance, the application of heat at one adsorbent interface provides the endothermic desorption of sorbate molecules and the rejection of heat at the opposing interface provides the exothermic adsorption of the sorbate molecules. The addition of sorbate molecules at the cold interface and the deletion of sorbate molecules at the hot interface establishes a concentration gradient in the adsorbent that drives the diffusion of adsorbed vapors from cold to hot. This phenomenon is more generally described by the thermodynamics of irreversible processes and is closely analogous to the thermoelectric effect. In any overview, the predominate driving forces are provided for by the concentration gradients.

The conditions of the experiment described by Gilliland et al, supra, were such that the pressure was held constant and was far below the saturation pressure of the vapors investigated.

Various means have been devised to provide heating or cooling from the solar energy source. One of the major problems which limits commercial feasibility of these systems is a very high initial cost as the result of schemes used to raise the effective temperature of the energy source by some sort of heat concentration means. The temperature increase has been found to be desirable and necessary in prior art systems in order to provide more efficient heat transfer characteristics in the heating/cooling systems.

Prior art cooling systems may be classified as evaporative or refrigerant systems. The evaporative systems are very ineffective unless operated in dry climates. Mohr's U.S. Pat. No. 2,202,019 is an example of such a system. Altenkirch's U.S. Pat. No. 2,138,691 teaches the use of silica gel and/or wood shavings as adsorbents used for the removal of moisture from air.

In solar engergized systems, some means must be supplied to provide a source of heat energy at those times when solar energy is unavailable or is in the short supply, i.e., at night or on overcast days. Löf's U.S. Pat. No. 2,680,565 teaches the use of a heat storage bed made of "a loose or spaced solid, such as sand, gravel or stacked brick, but which may be a fluid, such as tar, oil, water or the like." (U.S. Pat. No. 2,680,565, Col. 6, lines 40-42.) The storage bed may be charged with heat energy at those times of relatively bright sunlight and may be drawn upon as a source of heat energy when adaquate sunlight is not available.

Solar energy heating/cooling systems have been slow to receive public acceptance because of their complexity and high initial cost and because of the general tendency for the systems to be bulky and inefficient.

SUMMARY OF THE INVENTION

These and other shortcomings of the prior art are overcome in accordance with the present invention by utilizing the pumping capability of a solid adsorbent material exposed to a transverse temperature gradient in the presence of a sorbate material due to "leverage" attained as a result of sorbate diffusion. The vapor pumping action produced is used to supply the vapor pressure differential which is accomplished by gas compression in a vapor compression refrigeration cycle. The efficiency of the invention is effectively multiplied by the very high efficiency of the diffusion through a solid adsorbent under the influence of a temperature gradient.

According to one aspect of the present invention a vapor pumping action is produced by a solid adsorbent disposed between a low temperature-low pressure refrigerant vapor and a higher temperature-higher pressure vapor of the same type.

According to another aspect of the invention, the diffusion characteristics of a solid adsorbent, positioned between a low temperature-low pressure sorbable vapor and a higher temperature-higher pressure vapor of the same type, acts to produce a pumping action from the low pressure-low temperature side to the higher temperature-higher pressure side. It will be clear to one skilled in the art that the adverse pressure is a partial vapor pressure.

According to still another aspect of the present invention, the pumping action of a solid absorbent, positioned in a refrigeration gas environment such that a combination pressure/temperature gradient exists between a cooled and a heated side, acts to provide the necessary vapor pressure differential which is accomplished by gas compression in a refrigeration system of the vapor compression type.

According to yet another aspect of the present invention, a solid adsorbent is used to pump water vapor against a vapor pressure/temperature differential.

According to an additional aspect of the present invention, a solid adsorbent is used in an open or closed refrigeration system to pump refrigerant vapor from a cooler low vapor pressure side to a warmer high vapor pressure side.

According to another additional aspect of the present invention, a solid adsorbent is used to pump water vapor from a cooler low vapor pressure side to a warmer high vapor pressure side.

According to still another additional aspect of the present invention, solar heat energy is provided to warm a higher pressure side of a solid adsorbent to a higher temperature than a cooler lower pressure other side to provide a temperature gradient for urging a diffusion pumping action of a vapor from the cooler lower pressure side to the warmer higher pressure side.

According to yet another additional aspect of the invention, a supplementary neutral gas is utilized to equalize the total pressures on both sides of a solid adsorbent being used to pump a vapor from a low partial pressure side to a high partial pressure side.

The foregoing and other aspects of the present invention will be more fully understood from inspection of the detailed description which follows and from the accompanying drawings in which.

DETAILED DESCRIPTION OF THE INVENTION

Figure 5A:
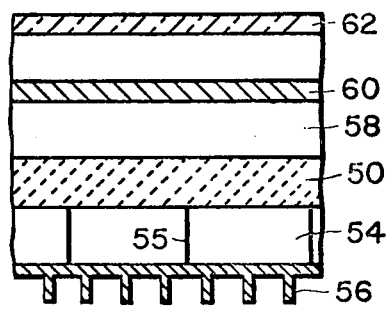
FIGS. 5 and 5a illustrate the vapor pump of the invention.
Figure 5B:
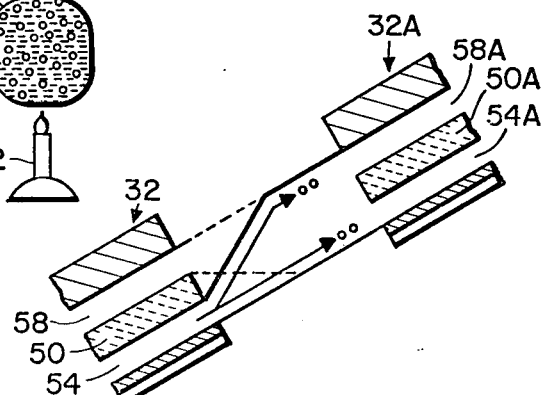
FIG. 5b is illustrative of a series or cascade arrangement of two identical vapor pumps of the invention.
Figure 5:
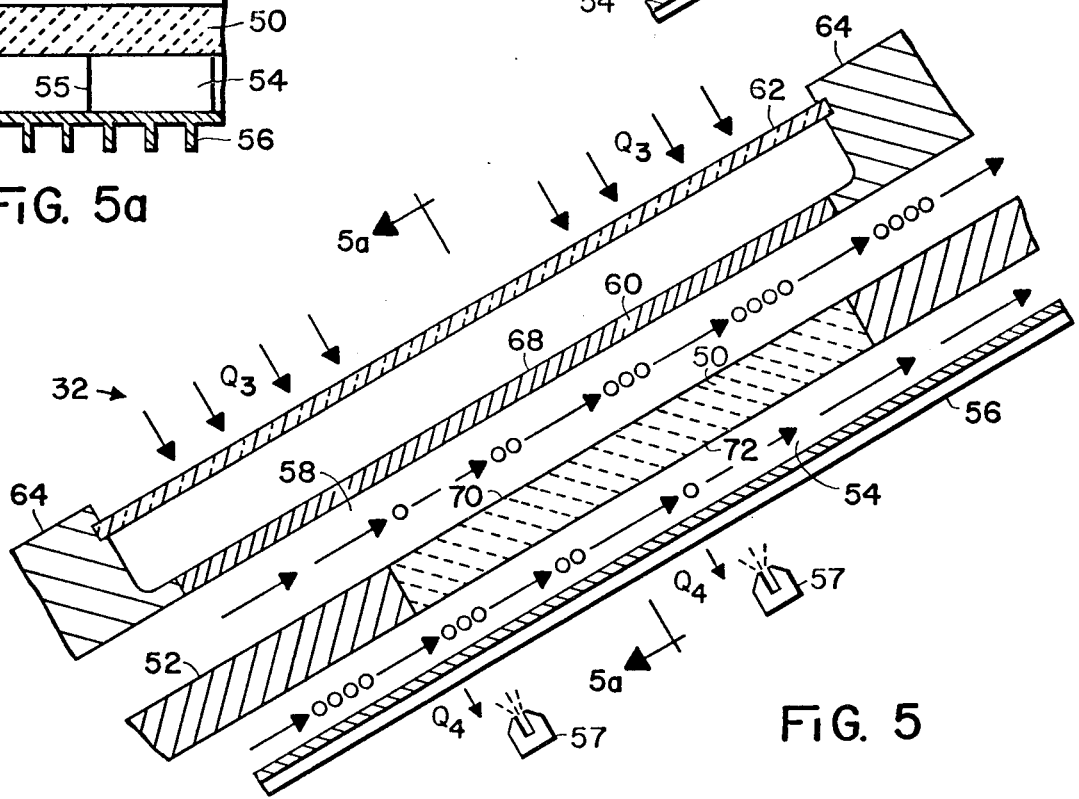

Referring first to FIG. 5, adsorbent layer 50 is held by support 52. Plenum 54 is formed between adsorbent 50 and heat exchanger 56. Heat exchanger 56 may be cooled by application of a water spray from spray heads 57. Plenum 58 is formed between adsorbent 50 and heat absorber 60, on the opposite side. Heat absorber 60 is preferably covered by transparent member 62 which may be made of glass. Support 64 serves to support heat absorber 60 and transparent surface 62 in a predetermined relationship with respect to adsorbent 50. Heat source $Q_3$, which may be the sun, is arranged to radiate heat energy through transparent member 62 into heat absorbent member 60. Heat absorber 60 may be surfaced on one side 68 with means for enhancing heat absorption qualities, such as black paint or other highly absorbtive surface finish. The space between heat absorber 60 and transparent surface member 68 is preferably filled with a low density gas or vacuum to inhibit loss of heat by convection from heated absorber 60. Clearly, if a vacuum is used, the pressure differential across the glass will be significant and must be dealt with. Of course, other means of reducing convective loss may also be used. Adsorbent 50 may be any of a number of different materials which operate as effective adsorbents. One such material which might be used is silica gel. Some ceramic materials such as alumina or other metal oxides might be used and experiments indicate that Vycor porous glass as manufactured by Corning Glass Works, Corning, N.Y., is a suitable material.

It will be understood that the surface areas of adsorber 50, heat exchanger 56, heat absorber 60 and transparent member 62 are set by design requirements of the particular application. Surface areas from a fraction of a square inch to many thousands of square feet may be required in different applications to provide the necessary diffusive mass flow required for the particular applications. The structural requirements of larger panels may be met by providing cellular structural members or other structural systems for support of the large, flat surfaces. In the case of adsorber 50, if granular materials are utilized, they may be placed in the interstitial spaces of a cellular structural member (not shown). The cellular member should preferably, have low heat conductance properties to prevent degeneration of the temperature gradient across adsorber 50. It is also important that the thermal conductivity of adsorber 50 be relatively low for the same reason.

A description of the operation of the invention herebefore described will help the reader to understand the purpose of the various materials. Heat source $Q_3$ is used to warm surface 70 of adsorbent 50. This is accomplished by means of radiant energy reaching heat absorber 60 through transparent surface 62. The heat source may be any one of a number of types and, of course, a number of other methods may be used to raise the temperature of surface 70 with respect to surface 72. An important heat source for this purpose is solar energy from the sun. It is important to understand that surface 70 of adsorbent 50 is warmer than surface 72. The positive temperature gradient across adsorbent 50 is important to the operation of the invention. Surface 72 must be cooler than surface 70 and, conversely, surface 70 must be warmer than surface 72. Under these conditions a sorbate material, such as water vapor, may be introduced in plenum 54 in proximity to cooler surface 72 of adsorbent 50. Materials such as silica gel are said to be hygroscopic; that is, they have an affinity for water. They may also have an affinity for other vapors. The water vapor sorbate in an air carrier is attracted to adsorbent 50. Adsorbent 50 is permeated with a myriad of micropores in the size range of from $10^{-6}$ to $10^{-7}$ centimenters. There is a physical attraction between each of the micropores and the individual water vapor molecules in plenum 54. When a molecule of the water vapor comes in contact with one of the many openings in adsorbent 50 it is attracted therein. When a water vapor molecule is attracted into one of the micropores in adsorbent 50 it is physically entrapped in the opening forming an adsorbed phase. The result in terms of heat energy is slightly greater than that which would occur if an equivalent amount of water vapor were condensed to liquid form. When the adsorbed phase is formed, the heat of absorption is released. It is necessary to the operation of the invention that this heat be dissipated in some manner. If it were not dissipated, surface 72 of adsorbent 50 would warm up and the temperature gradient across adsorbent 50 would disappear. Therefore, heat exchanger 56 is used to carry heat away from the sorbate carrier, typically air, in plenum 54.

FIG. 5a shows the cross section of the pump of FIG. 5 at reference line 5a—5a. The air/vapor mixture in plenum 54 is channeled between baffles 55 and baffles 55, in turn, provide structural support between adsorber 50 and heat exchanger 56 and also provide for conductive heat flow from adsorber 50 to heat exchanger 56. Baffles 55 are parallel to the main flow of the air/vapor mixture in plenum 54, therefore contributing a relatively low impediment to the air/vapor flow. In some applications, it will not be necessary to enclose plenum 54 at the bottom side. (See, for example, FIG. 10.) Baffles 55 then may be utilized as fins for heat transfer to the ambient air.

In FIG. 5, the water vapor molecules in plenum 54 are represented as small circles, while the air molecules are represented as arrows. The arrows also indicate the preferred direction of flow of the water vapor/carrier mixture. It should be noticed that water vapor molecules are being continually removed from the air carrier in plenum 54 because of their attraction to the adsorbent 50. The number of water vapor molecules shown at the upper end of plenum 54 is minimal.

So far the discussion has centered on the adsorbent characteristic of material such as silica gel. It will be well known to one skilled in the art that silica gel is a hygroscopic material that attracts water vapor out of air. It will be equally well understood that a given volume of silica gel has a limited capability for attracting water. Once the silica gel volume is saturated with water it will no longer attract new water vapor molecules. It is, therefore, a scheme of the invention to desorb water vapor molecules at opposite side 70 of adsorbent 50 thereby providing additional capacity for adsorption of water vapor molecules at surface 72 of adsorbent 50.

The desired additional capacity of adsorbent 50 to accept a continuous stream of water vapor molecules from plenum 54 is accomplished by removing water vapor molecules from adsorbent 50 into plenum 58 on the opposite side of adsorbent 50. This is accomplished by warming surface 70 of adsorbent 50 so that the liquid state water which has migrated through adsorbent 50 to surface 70 will be de-adsorbed in the form of water vapor molecules in plenum 58. It will be noted that at the lower end of plenum 58 there is a dearth of water vapor molecules while at the upper end of plenum 58 the water vapor molecules are relatively more plentiful. As in plenum 54, plenum 58 is represented as a conduit for both air and water vapor. Again, as in plenum 54, the air is represented by arrows; the water vapor molecules are represented by small circles. Transparent member 62 and absorber 60 may extend beyond the lower end of adsorber 50 so that the relatively dry air at the lower end of plenum 58 is preheated before reaching surface 70 of adsorber 50. Liquid water in adsorbent 50 is constantly being de-adsorbed from surface 70 under the influence of the heat generated by heat absorber 60. There is a sensible heat transfer from heat absorber 60 to adsorbent 50 surface 70. The conversion of the water from the adsorbed state to the de-adsorbed vapor state requires the heat of desorption, a concept which will be well known to one skilled in the art.

The invention as heretofore described may be thought of as a water vapor pump. However, the pumping action is not limited to the use of water vapor. Other materials which convert easily from gas to liquid state and vice versa might also be used. Typical of these are ammonia and Freon (a trademark of E. I. Dupont de Nemours & Company).

It will also be understood that materials other than silica gel and Vycor porous glass may be serviceable as the microporous adsorbent. For example, oxides of aluminum and other metals may provide the necessary hygroscopic and/or adsorbent characteristics.

Further, it will be understood that the usefulness of the pump of FIG. 5, described herein, may be enhanced under some operating conditions by cascading the operations of a plurality of such pumps as shown in FIG. 56. The mixture emitted from plenum 54 of pump 32 may be introduced into the input end of plenums 54a and 58a of identical pump apparatus 32a. Since the partial vapor pressures would initially be equal in the two plenums of second pump 32a, under the influence of a similar temperature gradient, the second pump apparatus will proceed to cause still further bulk vapor flow from its cooler to its warmer side. The result is a still dryer mixture at the output of plenum 54a of second pump 32a. The cascading technique may be carried on similarly to still more pumps in a like manner. Similarly, if the output of plenum 58 is introduced into the inputs of plenums 54a and 58a of second identical pump 32a, a still wetter mixture of air and water will be available at the output of plenum 58a of second pump 32a.

The diffusion pumping action generated by the invention, as described, is capable of overcoming an adverse partial vapor pressure differential between plenum 54 and plenum 58. Once this fact is accepted, it becomes clear that the invention may be used in a number of ways.

Figure 10:
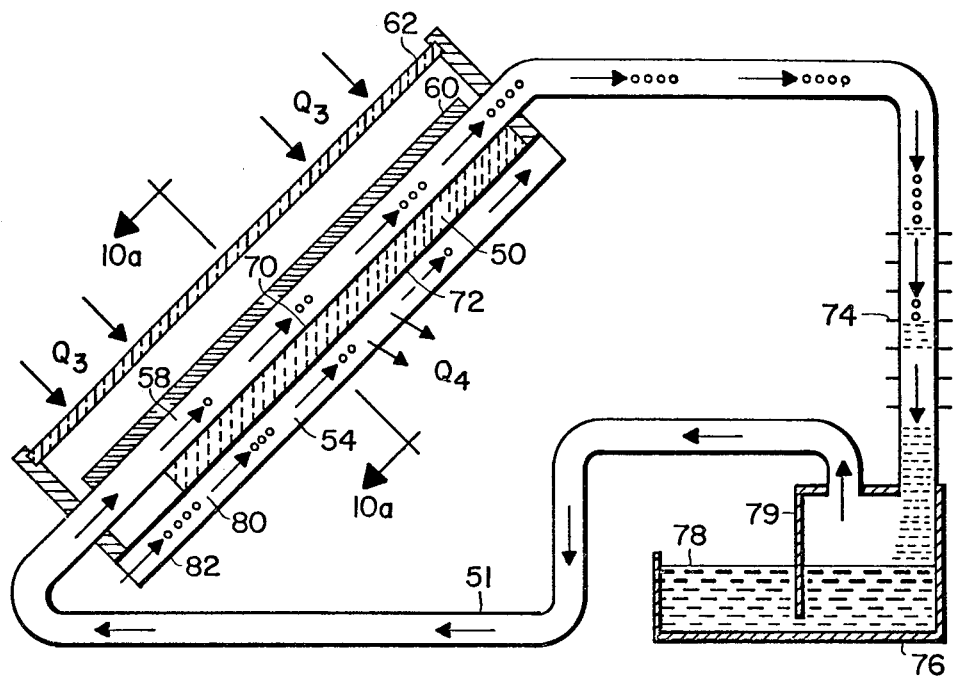
FIG. 10 is illustrative of a system for extracting pure water from relatively dry ambient air using the pump apparatus of FIG. 5.
Figure 10A:
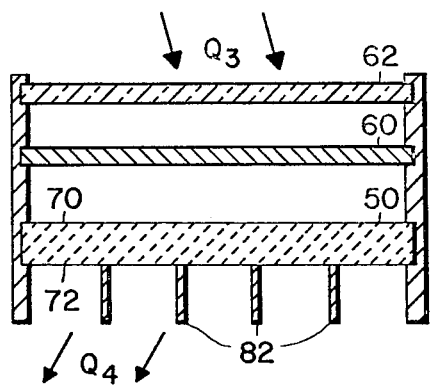
FIG. 10a is a cross section of the apparatus of FIG. 10.

For example, referring to FIG. 10, the apparatus of the invention, with little modification, may be used to generate fresh water from low humidity air. Even in the very dry air conditions of the Southwestern deserts of the United States, for example, where the ambient humidity is frequently in the range of from five to ten percent, water vapor which may be contained in air 80 will be adsorbed into adsorbent 50. A very small air motion across surface 72 of adsorbent 50 is sufficient to supply new, relatively moist air to replace the dry air which is created when moisture vapor is adsorbed into adsorbent 50. Cooling fins 82, such as shown in both FIG. 10 and FIG. 10a, may be utilized on the face of adsorbent 50 to aid in rejection of the heat of adsorption from surface 72. The heat of adsorption also causes air 80 to become less dense and rise along surface 72. This convective motion of the air in contact with surface 72 assures a constantly refreshed quantity of moisture bearing air at surface 72. Of course, any movement of air 80 caused by natural causes, such as wind, will also enhance this effect. The heat of adsorption is carried off, then, by both the motion of air 80 and, if used, fins 82. This assures that surface 72 is adsorbent 50 stays close to ambient temperature. The upper side of adsorbent 50 is heated, as has been previously explained, by heat source $Q_3$ impinging on heat absorbing surface 60 through transparent member 62, which may be glass. Utilization of careful design techniques, well known in the art, may provide a heat temperature gradient across adsorbent 50 in the neighborhood of 100° Fahrenheit since known flatplate collector techniques may provide an operating temperature of about 200° Fahrenheit when the ambient is 100° Fahrenheit. This temperature gradient of 100° Fahrenheit is more than adequate to provide the pumping action previously described. For example, if the device of FIG. 10 is operated in an ambient temperature environment of 100° Fahrenheit, relative humidity 10%, the partial vapor pressure at surface 72 will be equal to slightly less than 0.1 pounds per square inch. From a standard psychrometric table it may be determined that in order for water to condense out of air at a temperature of 100° Fahrenheit it is necessary for the partial vapor pressure to be 0.9492 pounds per square inch. Therefore, adsorbent 50 must have a partial vapor pressure gradient of 0.8492 pounds per square inch between surface 72 and surface 70. Regardless of the total pressure in plenum 58 the partial pressure of water vapor in plenum 58 will cause water vapor to migrate to the top of plenum 58 and thence down through condenser 74. Condenser 74 provides an ambient temperature heat exchange to a sink of 100° Fahrenheit or a reduction in the temperature of the vapor of nearly 100° Fahrenheit below the approximately 200° Fahrenheit temperature of the vapor at the input to condensor 74. While the air/water vapor mixture in condenser 74 is reduced to 100° Fahrenheit with a partial vapor pressure of 0.9492 pounds per square inch, condensation occurs. Condensation forms water 78 in container 76. It is useful to note that container 76 may be left open at the top. This means that if, for example, the device of FIG. 10 is desired to be used for generating drinking water for farm or range animals, the system becomes self-tending. Conduit 51 provides a return path to plenum 58 for facilitating free connective flow through plenum 58. Barrier 79 prevents the air from condenser 74 from escaping to the outside and assures that it is channeled back through conduit 51 to plenum 58.

Another significant use for the instant invention is suggested by a more classical use for hygroscopic materials such as silica gel. It is well known in the art to use silica gel or similar hygrocopic material to evacuate moisture from a closed volume. This has been done wherever a dry environment is required, for example, for effective operation of equipment such as sensitive electronic circuits. Generally, such enclosures are sealed to help prevent migration of air and moisture from the environment into the enclosure. However, even the best sealing methods are not one-hundred percent effective. Over a period of time some moisture does migrate into the enclosure because the seal is not perfect. In order to minimize the effects of this problem, the prior art practice has been to place a small amount of silica gel, a hygroscopic material, into the enclosure at the time of sealing. Of course it is necessary to purge the container of any moisture present at the time of sealing in order for the procedure to be effective. The silica gel is placed in the container in its dry state and serves only to capture whatever water vapor enters the enclosure through the seal over the lifetime of the the seal. The problem presented by this system lies in the fact that the silica gel has a limited capacity to adsorb moisture. Once this capacity is reached, the silica gel is no longer effective and the vapor content within the enclosure begins to increase.

Figure 9:
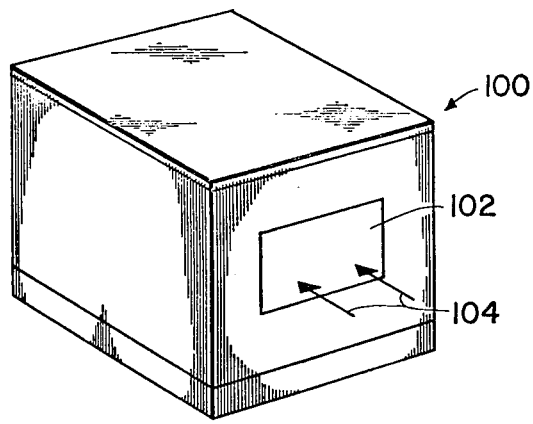
FIG. 9 is an illustration of the vapor pump of the invention when utilized as a continuously operating dehumidifier for an enclosed volume.

FIG. 9 is illustrative of the use of the invention to solve this particular problem. Enclosure 100 may be of the type generally used to protect electronic equipment from an external environment. FIG. 9 illustrates the insertion of hygroscopic window 102 in one surface of enclosure 100. Window 102 may be of a material such as Vycor porous glass as manufactured by Corning Glass Works, Corning, N.Y. or any other rigid hygroscopic material. Heat source 104 serves to heat the outer surface of window 102 to a higher temperature than the inner surface of window 102 thereby setting up the requirements for vapor pumping from a cooler inner surface to a warmer outer surface. Since window 102 is constantly being regenerated by the desorption process at the outer surface, window 102 never becomes saturated with moisture vapor and for all practical purposes may be considered to have an infinite life dependent only on the presence of heat source 104. In this manner, it becomes possible to limit the buildup of moisture within enclosure 100 for as long as is necessary.

It will be clear to one skilled in the art that by controlling the temperature gradient across window 102, the moisure content in enclosure 100 may be closely controlled in turn.

Figure 1:
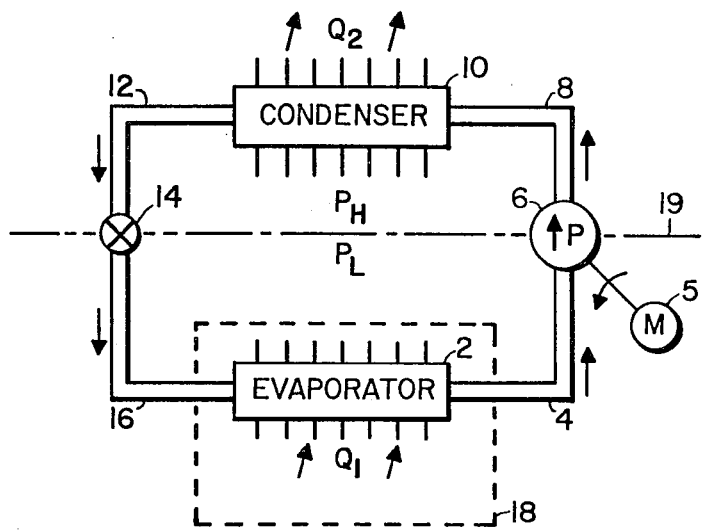
FIG. 1 is a diagram of a prior art vapor compression cycle refrigeration system.
Figure 2:
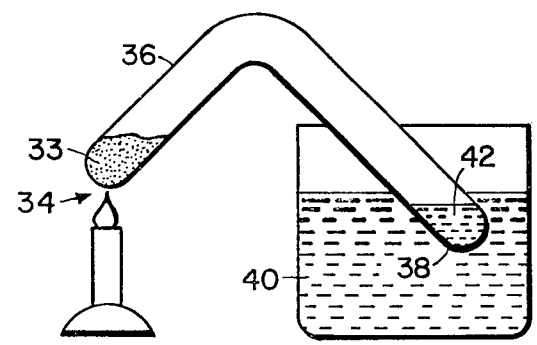
FIG. 2 is illustrative of the silver chloride-ammonia absorbent refrigeration system experiments accomplished by Faraday in 1824.
Figure 3:
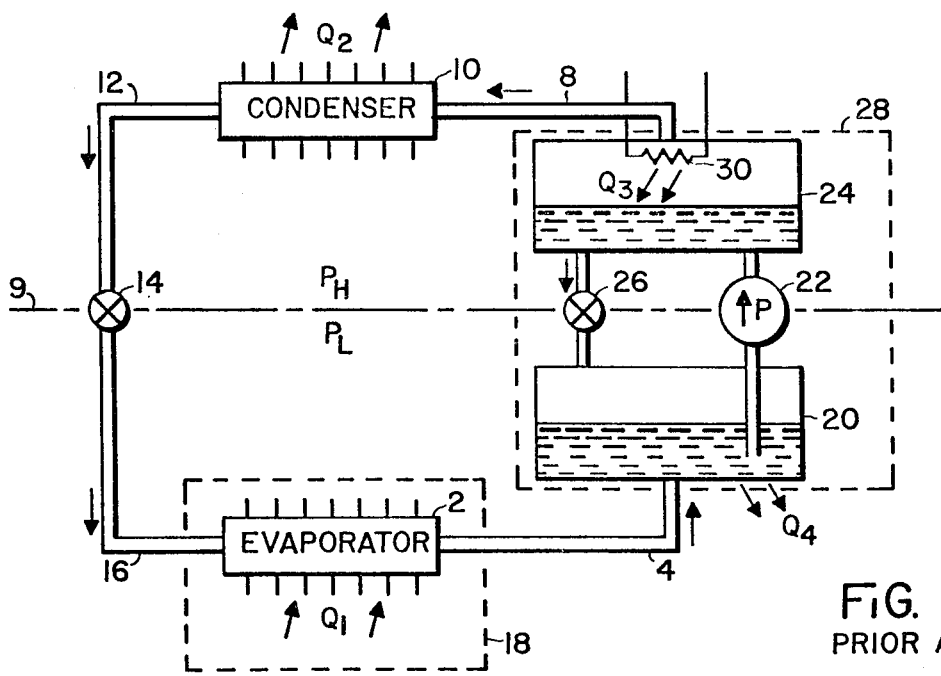
FIG. 3 is a diagram of a prior art continuously operating absorption refrigeration system.
Figure 4:
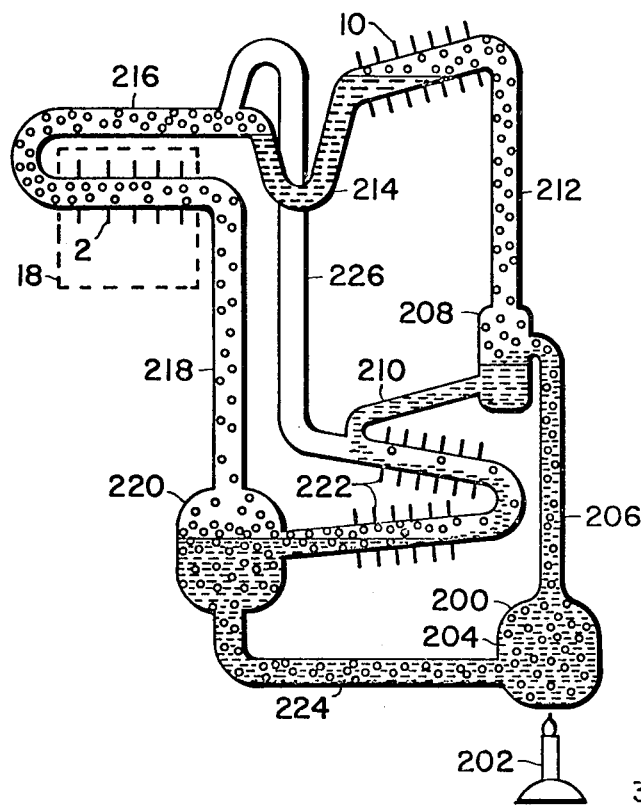
FIG. 4 is a simplified diagram of a prior art vapor absorbent cycle refrigeration system as manufactured by Servel, Inc., incorporating hydrogen gas as a pressure equalizing medium.

As has been previously described, FIG. 1 illustrates the well known prior art vapor compression refrigeration system. Line 19 divides high pressure side, $P_H$, of the system from low pressure side, $P_L$, as shown. FIG. 3 illustrates a similar system wherein pump 6 and motor 5 (FIG. 1) have been replaced by apparatus 28. Pump 22 of apparatus 28 is used solely for moving liquid from a low pressure to a high pressure. As in FIG. 1, line 19 separates high pressure side, $P_H$, from low pressure side, $P_L$, of the system. Pump 22 accomplishes no compression of the vapor. As will be well known to one versed in the art, the system of FIG. 3 is known as a vapor absorption system. For purposes of illustration it may be considered that water and ammonia are used in this system. Generator 24 contains a supply of water into which ammonia gas has been absorbed. Heater 30 serves to raise the temperature of the water mixture by injection of heat $Q_3$ so that ammonia gas is desorbed into conduit 8. The ammonia gas is converted to a liquid in condenser 10 by removing heat energy from the vapor. The liquid ammonia proceeds through conduit 12 to expansion valve 14. Expansion valve 14 allows the liquid to expand to a lower pressure thereby being converted to the vapor state in conduit 16 and evaporator 2. The process of vaporization cools the evaporated gas allowing it to absorb heat from enclosure 18 by means of evaporator 2. The ammonia vapor in conduit 4 is thereby warmed to nearly the temperature of enclosure 18. The relatively warm ammonia gas in conduit 4 is introduced into absorber 20 where it is readily absorbed into the water. Pump 22 is used to pump the water containing the absorbed ammonia vapor to generator 24. Throttle valve 26 is utilized to circulate the water in generator 24 back to absorber 20. Absorber 20 gives up heat $Q_4$. Since a certain amount of the ammonia vapor which is absorbed in the water in absorber 20 is desorbed from the water in generator 24, the water which is returned to absorber 20 from generator 24 is relatively free of ammonia vapor. The key to the operation of such an ammonia/water absorption system is the molecular attraction between the absorbent (water) and the refrigerant (ammonia). The molecular attraction is strong enough to allow the refrigerant molecules to be taken out of the vapor phase and to put them into the liquid phase thereby releasing the heat of condensation plus an additional heat of solution. This is the basis of operation for absorption process refrigeration systems and enables replacement of the mechanical compressor which is found in vapor compression systems such as pump 6 and motor 5, as shown in FIG. 1. The absorption process of FIG. 3 takes place in the low pressure region of the refrigeration cycle. The solution containing both the sorbate and sorbent is then pumped to the generator on the high pressure side where ammonia is vaporized off by the addition of heat $Q_3$. The sorbent recirculates through second throttle valve 26 back to the low pressure side where it picks up more refrigerant. Meanwhile, the refrigerant released by heat regeneration in the generator circulates back through the normal path just as it did in the vapor compression cycle of FIG. 1. The work done by pump 22 in the absorption cycle of FIG. 3 is negligible because the pump does not compress vapor but merely pumps a liquid from a low to a high pressure. In fact, the pump is eliminated in some existing liquid-liquid absorption refrigerators. Such a system is shown in FIG. 4.

Figure 6:
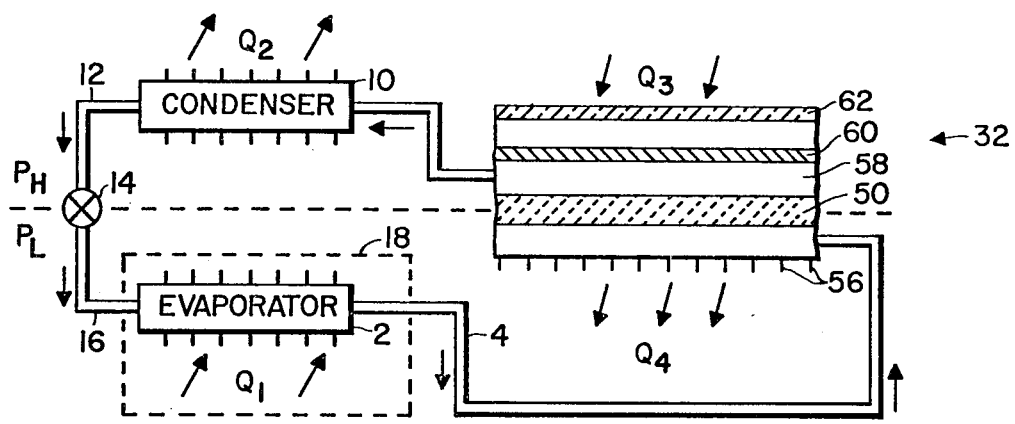
FIG. 6 is a diagram of the vapor pump of the invention in an idealized embodiment of a closed cycle refrigeration system.
Figure 7:
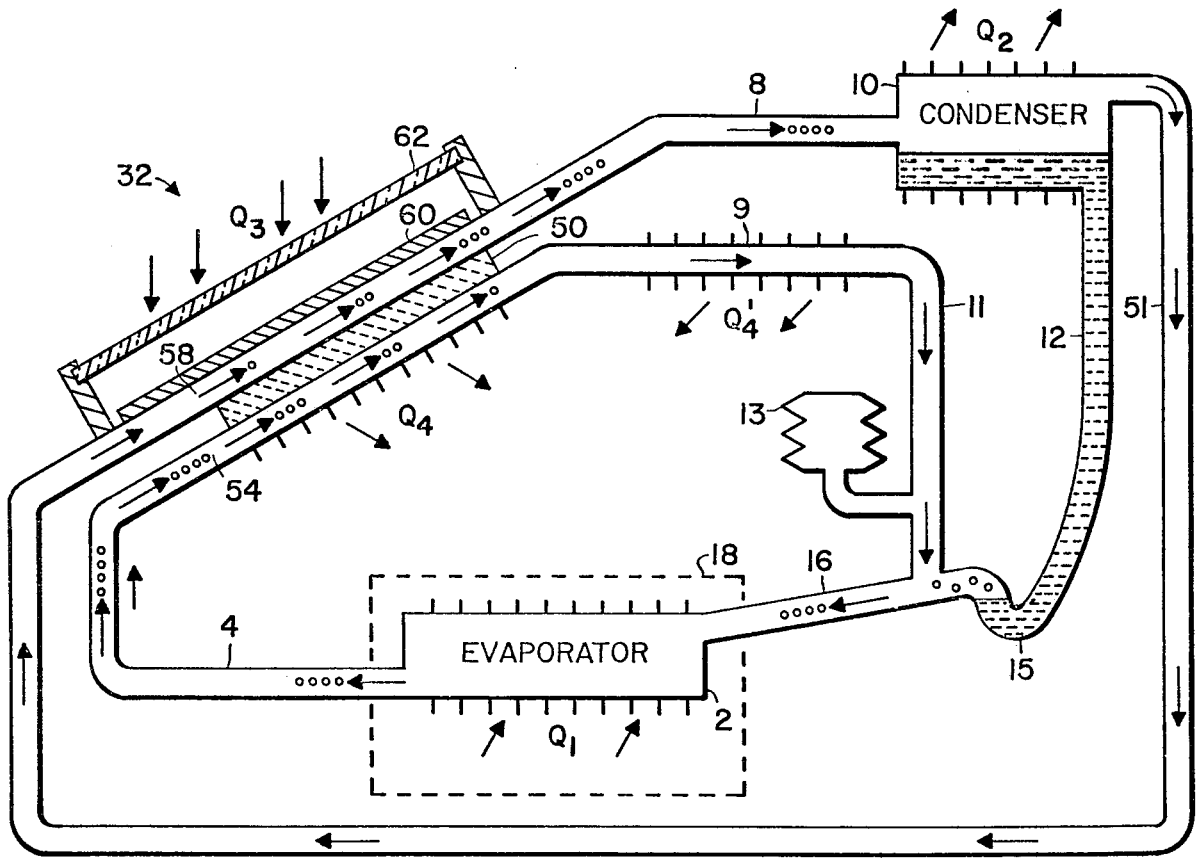
FIG. 7 is a diagrammatic illustration of a closed cycle refrigeration system using the pump of FIG. 5.

FIG. 6 illustrates a rudimentary and theoretical application of the pump of the invention in a refrigeration system. By making a direct comparison it may be seen that the apparatus in dashed box 28 of FIG. 3 is replaced in FIG. 6 by pump 32 of the invention comprising adsorbent 50, plenum 54, plenum 58, heat adsorbing plate 60 and transparent surface 62. Condenser 10, throttle valve 14 and evaporator 2 are identical to those of the system of FIG. 3. Pump 32 serves to adsorb warm low pressure vapor from conduit 4 and deliver a higher pressure-higher temperature vapor into conduit 8 just as was accomplished by apparatus 28 of FIG. 3. The rest of the system of FIG. 6 operates in the same way as those of FIGS. 1 and 3. However, there are some practical problems involved in the use of pump 32 in this application. It will be clear that there is a large total pressure difference required across pump 32. This pressure gradient induces relatively high stresses in adsorbent 50, heat adsorbing plate 60 and transparent means 62. Clearly, it would be advantageous to reduce these pressures in order to make pump 32 less expensive and less complicated to manufacture. FIG. 7 illustrates a refrigeration system in which this problem is solved.

The refrigeration system of FIG. 7 incorporates some of the aspects and features of the Servel, Inc. refrigeration system, previously described. (See FIG. 4.) In addition to a sorbate and an adsorbent, the system of FIG. 7 also utilizes a neutral gas for purposes of equalizing total pressure throughout the system, such as the hydrogen gas used in the Servel, Inc. system of FIG. 4. For purposes of illustration it will be assumed that the system of FIG. 7 utilizes water as a refrigerant and hydrogen as a neutral gas.

It will be understood that water has relatively low vapor pressure characteristics which will limit mass flow in a closed system such as this one. A more significant amount of cooling would be provided by a refrigerant such as Freon 113 which has a much higher vapor pressure, yet is a liquid at ambient temperature and pressure conditions. It will be further understood that other readily available commercial refrigerants may also be used and that references to water and water vapor in the present description are only illustrative of other refrigerants which may also be used.

According to Dalton's rule of partial pressures, the liquid or vapor pressure of water in the various parts of the system plus the hydrogen pressure in that portion of the system will always equal a given total pressure. This may be expressed as:

$$P_T = P_{PV} + P_{PH}$$

where:
$P_T$ = total pressure
$P_{PV}$ = partial vapor pressure of water
$P_{PH}$ = partial pressure of hydrogen gas.

The system of FIG. 7 is evacuated and then water and hydrogen are introduced in a proportion which will be well known to one skilled in the art of refrigeration. Generally, the water will seek the lower (gravitational) levels of this system and the hydrogen will migrate to the higher levels of the system due to the density differences between hydrogen and water. The total pressure $P_T$ is chosen to be equal to atmospheric pressure, about 14.7 pounds per square inch. This enables the system to operate under zero total pressure gradient with respect to the ambient pressure outside of the system. The advantage of such an arrangement lies in the fact that the large flat surfaces such as transparent member 62, heat absorbing plate 60 and adsorbent 50 may be constructed so that they only need to support their own weight. It will be understood and well known by one skilled in the art that while $P_T$, the total pressure throughout the system, is equal; the partial vapor pressures of water in the various parts of the system will be quite different. This will become more apparent as the system is further explained.

As heat absorber plate 60 is exposed to a radiant heat source, either the sun or some other source, the upper surface of adsorber 50 adjacent to plenum 58 warms up and the partial pressure in plenum 58 increases because of the increased heat energy. Water vapor in plenum 58 begins to rise in conduit 8 and proceeds to condenser 10 where it is cooled by ambient air and converted to liquid form. The heat of condensation is transferred from condenser 10 at $Q_2$. The hydrogen in the system is unaffected by the additional heat except that it may expand somewhat thereby marginally raising the total pressure in the system. In systems where it is deemed to be unadvisable to allow this expansion to create higher pressure, a simple "breathing" expansion chamber 13 may be utilized to solve that problem. The water which condenses in condenser 10 flows through conduit 12 to liquid trap 15. When the system is stabilized in a fully operable condition, no liquid flows beyond liquid trap 15. Water vapor is formed from the liquid in liquid trap 15 due to the lower vapor pressure beyond that point and flows through conduit 16 to evaporator 2. The conversion of water from liquid to vapor state in conduit 16 causes the water vapor to cool. This is a result of the conversion of sensible heat to the latent heat of vaporization. Accordingly, the water vapor in evaporator 2 is relatively cold. This allows heat transfer to take place from environment 18 through evaporator 2 heat exchanger fins to the water vapor therein. Thus, the water vapor at the exit of evaporator 2 in conduit 4 is nearly at the temperature of environment 18. The relatively warm water vapor rises in plenum 54 of pump 32. Adsorber 50 is made of a hygroscopic material such as silica gel, Vycor porous Glass or an oxide of metal. Therefore, it attracts the water vapor molecules out of plenum 54.

As the gas/vapor mixture rises in plenum 54, moisture is adsorbed into adsorber 50 and exothermic heat (heat of adsorption $Q_4$) is given up. The heated gas/vapor mixture is urged to the upper end of plenum 54 by reason of the tendency of the warm gas to rise. The warm, dry gas from plenum 54 is fed through heat exchanger 9 to further reduce the temperature toward ambient by releasing heat energy $Q_4$. This near ambient temperature dry gas is then introduced into conduit 16 at a point just beyond liquid trap 15 and the very low vapor pressure thus created at that point causes the liquid in liquid trap 15 to readily evaporate in the dry gas. As has been previously described, the latent heat of vaporization lowers the gas temperature going into evaporator 2.

The water vapor from plenum 54, which was adsorbed by adsorber 50, is de-adsorbed into plenum 58 under the influence of heat source $Q_3$. Thus, the gas moving upward in plenum 58 becomes supersaturated with water vapor. The partial water vapor pressure in plenum 58 is increased and the supersaturated gas moves through conduit 8 to condenser 19. Condenser 10 cools the gas/vapor mixture and causes much of the water vapor to condense to a liquid state. The gas/vapor mixture that is left moves through conduit 51 to the lower or input end of plenum 58. The liquid water from condenser 10 moves through conduit 12 to liquid trap 15. It will also be understood that hydrogen in the system will help to fill the conduits of the system. Therefore, the conduits will operate at $P_T$, the total pressure of the system, about 14.7 pounds per square inch absolute.

Figure 8:
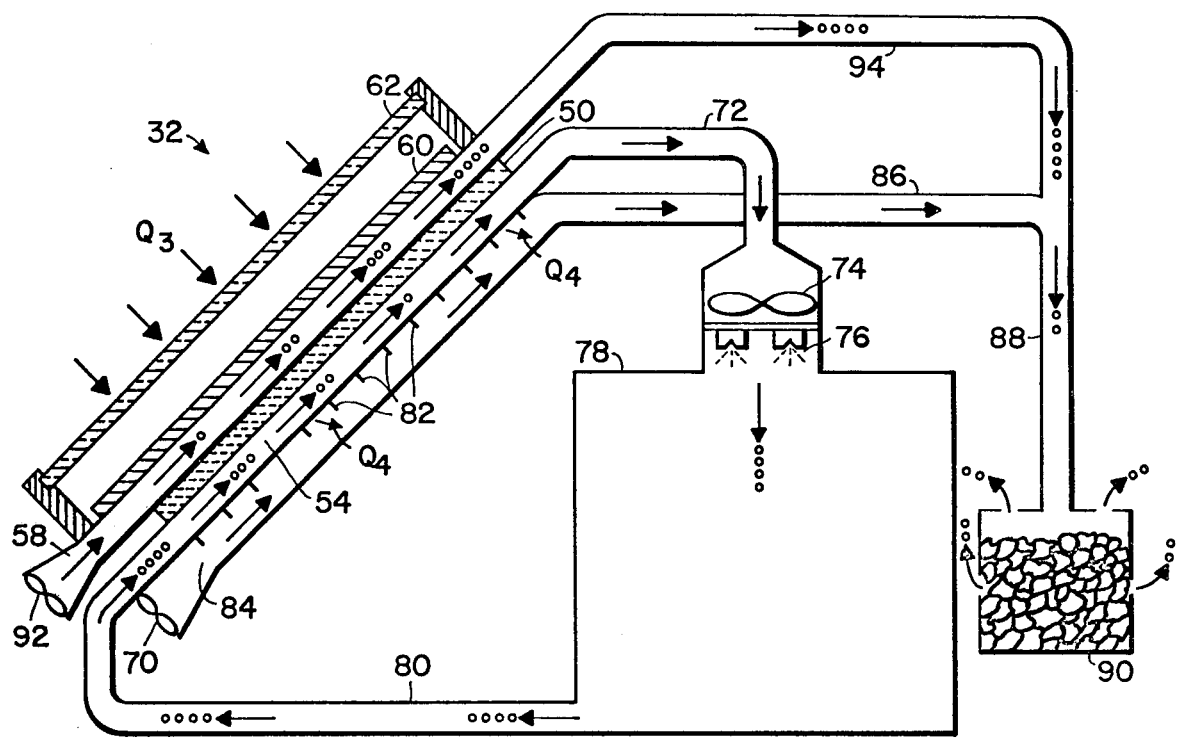
FIG. 8 is a diagram of the vapor pump of the invention in a typical embodiment of an open cycle refrigeration system.

The pump of the invention may also be utilized in an open cycle refrigeration system such as is illustrated in FIG. 8. The pump of the invention is used to dry air which will then be used for cooling an environment. Relatively moist warm air is introduced into plenum 54 where moisture is removed by adsorber 50 as has been before described. The relatively dry air moves through duct 72 under urging of fan 74. Water vapor is injected into the dry air by spray nozzle 76. A reduction in air temperature is caused by the heat of vaporization required for the vaporization of water introduced by spray nozzle 76. The air, now cooled and carrying a relatively higher moisture content, is injected into environment 78 where ambient heat energy warms the air. The warm, moist air now moves through duct 80 back to plenum 54 and the cycle begins again. As water vapor from the air is adsorbed by adsorber 50, the heat of adsorption is carried away by heat exchangers 82. Ambient air at a lower temperature is moved under the urging of fan 70 through plenum 84. This ambient air carries off the heat of adsorption from heat exchangers 82 through duct 86. This air is now relatively warm and moist. It is channeled through duct 88 to heat storage system 90 which may comprise a rock pile or similar granular material contained in a porous container. Alternatively heat storage device 90 may be comprised of relatively small containers of water so arranged so that ambient air may circulate freely through them. Fan 92 urges ambient air through plenum 58. Water in adsorber 50 is desorbed into the air moving through plenum 58. This moisture-laden air is then transported through duct 94 and duct 88 to storage device 90. Of course, it will be understood that adsorber 50 is heated on the side adjacent to plenum 58 by a heat source such as the sun. At those times when the sun is obscured either by the earth or by the environment, fan 92 may be reversed to draw warm air out of heat storage device 90 in order to provide the necessary temperature gradient across adsorber 50 to provide the pumping action. Since air drawn from heat storage device 90 is relatively dry, there is no problem with excessive partial vapor pressure in plenum 58.

In an open cycle refrigeration system such as has been described, supra, it will be clear to one skilled in the art that large quantities of air must be moved because of the relatively low partial vapor pressures inherent in the use of water as a refrigerant. It will also be clear that it is necessary to utilize mechanical devices such as fans 70, 74 and 92 to move the air through the system. Of course the amount of air to be moved will depend on the volume of the environment to be controlled as will be well understood by one skilled in the evaporative cooling art. The system of FIG. 8, however, has a large advantage over classical evaporative cooling systems. For example, in typical evaporative cooling systems the ambient humidity must be very low in order to have an effective operating system. In the system of FIG. 8 the pump of the invention is providing a source of dry air which would otherwise not be available. It is advantageous because it operates continuously without moving parts, that is, the removal of moisture from the air is not accomplished in a batch process manner. This enables the system of FIG. 8 to be operated in climates where evaporative coolers would not otherwise be effective. It will also be clear to one skilled in the art that a condenser could be placed in duct 88 of the system to reclaim the water vapor from the air moving therein in the form of liquid. This liquid water could be recycled and used in the water injection from water nozzles 76. In this manner the water used for cooling in the system would be restrained to a closed loop. Only that water not condensed in the above suggested alternate condenser would be lost. The alternative system utilizing the condenser in duct 88 would be of special importance in those climates where a plentiful water supply is not available.

Clearly, other applications for the invention described herein will be apparent to those skilled in the art. Various other modifications and changes may be made to the present invention from the principles set forth and described above without departing from the spirit and scope thereof as encompassed in the accompanying claims.

What is claimed is:

1. In a refrigeration apparatus having an evaporator for absorbing heat, a condenser for rejecting heat, a refrigerant and a pump, the improvement in the pump comprising:

microporous means having at least two working surfaces, said microporous means for adsorbing a vapor from a lower vapor pressure environment on a first of said at least two working surfaces and for desorbing the vapor to a higher vapor pressure environment from a second of said at least two working surfaces, said second surface being in heat energy communication with a heat source to provide a higher temperature at said second surface with respect to said first surface, said microporous means having pore sizes in the range of from $10^{-6}$ to $10^{-7}$ centimeters for providing high adsorption and surface diffusion characteristics.

2. The improvement according to claim 1 wherein said pump means is made of a hygroscopic material.

3. The improvement according to claim 1 wherein said another side is made warmer than said one side by application of heat energy to said another side.

4. The improvement according to claim 1 wherein the refrigerant includes a neutral gas for equalizing the total pressures in the apparatus.

5. The improvement according to claim 3 wherein said heat energy is supplied by a solar collector.

6. The improvement according to claim 2 wherein said hygroscopic material is silica gel.

7. The improvement according to claim 2 wherein said hygroscopic material is an oxide of metal.

8. The improvement according to claim 2 wherein said hygroscopic material is Vycor Glass.

* * * * *